United States Patent
Pfalzgraf

(10) Patent No.: US 6,398,130 B2
(45) Date of Patent: Jun. 4, 2002

(54) HEADLAMP WHICH IS INTENDED FOR A MOTOR VEHICLE

(75) Inventor: Helmut Pfalzgraf, Steinbach (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/389,849

(22) Filed: Sep. 2, 1999

(30) Foreign Application Priority Data

Sep. 15, 1998 (DE) .......................................... 198 42 249

(51) Int. Cl.$^7$ ................................................ B05B 1/10
(52) U.S. Cl. ..................................................... 239/284.2
(58) Field of Search ........................... 239/284.1, 284.2, 239/281, 280.5, 280, 531, 532, 456, 203, 204, 205

(56) References Cited

U.S. PATENT DOCUMENTS

| 3,117,727 A | * | 1/1964 | Pollock et al. ............ 239/284.2 |
| 3,658,074 A | * | 4/1972 | Wright ..................... 239/284.2 |
| 5,242,114 A | * | 9/1993 | Camier et al. ............ 239/284.2 |
| 5,269,464 A | * | 12/1993 | Epple et al. ............. 239/284.2 |
| 5,386,988 A | * | 2/1995 | Sung et al. |
| 5,446,630 A | * | 8/1995 | Chikada et al. ................ 362/66 |
| 5,769,323 A | * | 6/1998 | Hartick et al. ........... 239/284.2 |

FOREIGN PATENT DOCUMENTS

| DE | 3518685 | 6/1986 |
| DE | 4112060 | 10/1991 |
| DE | 4435941 | 4/1995 |
| DE | 4439445 | 5/1996 |
| GB | 2264044 | 8/1993 |

* cited by examiner

Primary Examiner—Lesley D. Morris
Assistant Examiner—Christopher S. Kim
(74) Attorney, Agent, or Firm—Martin A. Farber

(57) ABSTRACT

In a headlamp (2) having a housing (3), a headlamp cleaning system (5) is integrated in the housing (3). By this, the outlay during installation can be substantially reduced and at the same time the headlamp cleaning system (5) optimally matched to a lens (17) of the headlamp (2). At the same time, the housing (3) can optionally be fitted with or without the headlamp cleaning system (5), so that the installation procedure can be standardized. Moreover, retrofitting of the housing cleaning system (5) by simple exchange of the housing (3) is also possible.

5 Claims, 3 Drawing Sheets

HEADLAMP WHICH IS INTENDED FOR A MOTOR VEHICLE

FIELD AND BACKGROUND OF THE INVENTION

The invention relates to a headlamp which is intended for a motor vehicle and has a housing.

Headlamps of this type are nowadays increasingly obtained from the automobile manufacturers as a supplied part and are inserted in the manufacturing process into a corresponding recess in the front body. For this purpose, the housing of the headlamp is fitted with the required connecting elements, particularly with electrical contacts and retaining means.

Vehicles of the sophisticated category, in particular, are increasingly fitted with headlamp cleaning systems which enable a lens of the headlamp to be cleaned with ease while underway. For this purpose, a finely concentrated washer fluid jet is directed onto the lens in order thereby to detach particles of dirt from the lens. Other headlamp cleaning systems additionally have a wiper which wipes over the lens.

The complex geometry of modern headlamps, which in particular have sharply curved and very flat lenses, causes a disadvantageous effect. This necessitates the fluid jet being precisely matched and aligned to the lens, in particular with respect to the angle of the impacting washer fluid jet. Even small deviations may result in a perceptible decrease in the cleaning power. As a result, after the installation exact mutual adjustment of the headlamp and the headlamp cleaning system is required, which is associated with an additional outlay.

Consideration has also already been given to moving the headlamp cleaning system horizontally in front of the headlamp in order thereby to achieve a more favorable angle for the spraying procedure. A disadvantageous effect here is that the advantage obtained by the movability is considerably lessened because of the tolerances of the long supporting arm required for this purpose, and the required outlay for adaptation is increased.

SUMMARY OF THE INVENTION

The invention is based on the problem of designing a headlamp of the type mentioned at the beginning in such a manner that a deterioration in the cleaning action on account of manufacturing and installation tolerances of the headlamp is avoided. At the same time, the intention is for the outlay on installation to be reduced.

According to the invention, this problem is solved by the housing being designed to optionally accommodate a headlamp cleaning system. By this means, the headlamp combined with the headlamp cleaning system is designed as a constructional unit and can be inserted into the corresponding recess in the body as a unit. In the process, tolerances in the mutual alignment of the lens and of the headlamp cleaning system can be avoided, so that the angle of the washer fluid jet impacting on the lens of the headlamp can optimally be set and the cleaning action thereby considerably improved. Even a headlamp range adjustment, as can be found on new vehicles, does not have any effect on the mutual alignment of the headlamp cleaning system and the lens, since said system and lens are pivoted jointly. In the event of no headlamp cleaning system being provided on the vehicle, the headlamp may be fitted with a largely identical housing, so that the connections required for this and the fastening means can be of standard design for both versions. At the same time, the outlay on installation is reduced, since the constructional unit can be fitted in a single working step and the great variety of parts reduced.

For this purpose, it is particularly favorable if the headlamp has a combined connecting element for an electrical contact and a supply pipe for the washer fluid. This enables the outlay on installation to be further reduced by merely needing a combined connecting element for the electrical contact and the supply pipe for the washer fluid to be connected to the corresponding connection element of the vehicle.

A particularly advantageous development of the invention arises if the connecting element is a plug-in connection. This can be connected with ease during the manufacturing process of the vehicle without a tool to the corresponding structural element of the vehicle and can easily be exchanged in the event of a possibly required repair.

Another favorable embodiment of the invention also arises by the housing being designed to accommodate a control unit. This control unit makes optimum coordination of the cleaning procedure possible. In this case, for example, the volume flow of the washer fluid may be matched to the path of movement of the movable headlamp cleaning system, so that a considerably improved cleaning power can be achieved.

Another favorable embodiment of the invention arises by the housing being designed to accommodate a washer fluid container. As a result, the washer fluid container can be inserted into the housing of the headlamp in a space-saving manner corresponding to the rear contour of a reflector, and moreover saves on the awkward laying of washer fluid pipes in the engine compartment. At the same time, the insertion of the headlamp designed in this manner is possible without any problem through the arrangement in the front body region. In addition, each headlamp may be supplied via a separate washer fluid container or else connected by means of a washer fluid pipe to the washer fluid container of another headlamp.

The headlamp cleaning system could be designed as a washer nozzle which is arranged on the front side of the housing. However, an embodiment of the invention is particularly advantageous in which the housing has means for moving a washer nozzle of the headlamp cleaning system from a rest position into an operational position. By this means, the washer nozzle of the headlamp cleaning system can initially be moved into a position which is favorable for the spraying procedure, for example horizontally forwards. The positioning movement of the washer nozzle can in this case be matched optimally to the headlamp and to the volume flow of the washer fluid.

In this case, it is particularly advantageous if the means is a guide which flexibly pivots the washer nozzle in front of a lens of the headlamp. By this means, the washer nozzle can be moved into an optimum operational position, in particular directly in front of the lens of the headlamp, irrespective of the mounting position of the headlamp cleaning system. In particular, only a drive for an overriding, horizontal positioning movement and a pivoting movement upwards is required in this case. For this purpose, the headlamp cleaning system may, for example, have a supporting arm which is prestressed in the rest position. Other embodiments in which the guide brings about flexible deformation of the support arm, which is relaxed in the rest position, of the headlamp cleaning system, for example by two toothed wheels having a differing rate of advance each engaging into one of two racks connected in parallel, are also conceivable.

BRIEF DESCRIPTION OF THE DRAWINGS

The invention permits various embodiments. To further clarify its basic principle one of these is represented in the drawing and is described in the following. The drawings show, in a lateral basic representation of a front body section, in FIG. 1 a headlamp according to the invention with a headlamp cleaning system in its rest position, FIG. 2 the headlamp in an operational position.

DETAILED DESCRIPTION OF THE PREFERRED EMBODIMENT

Figure 1:
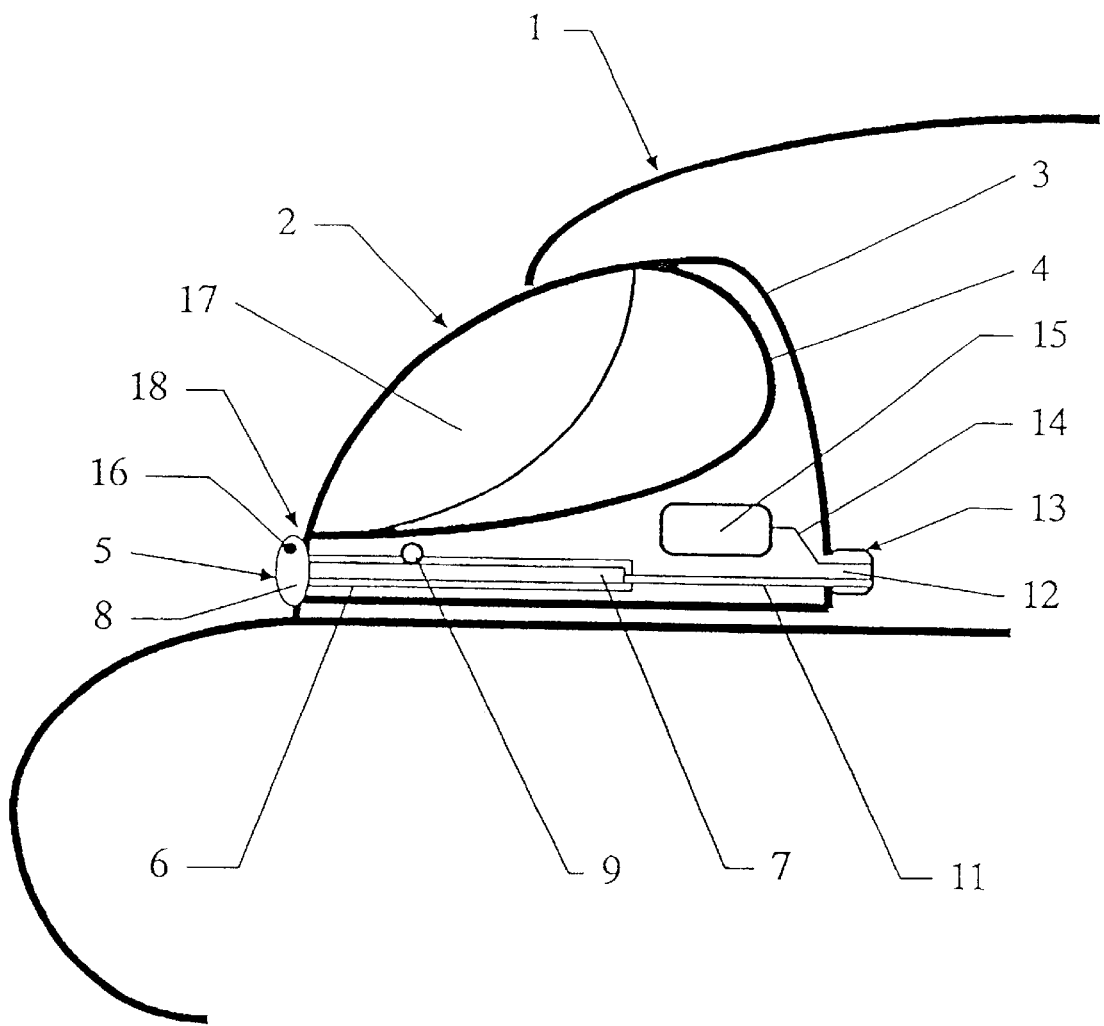
Figure 2:
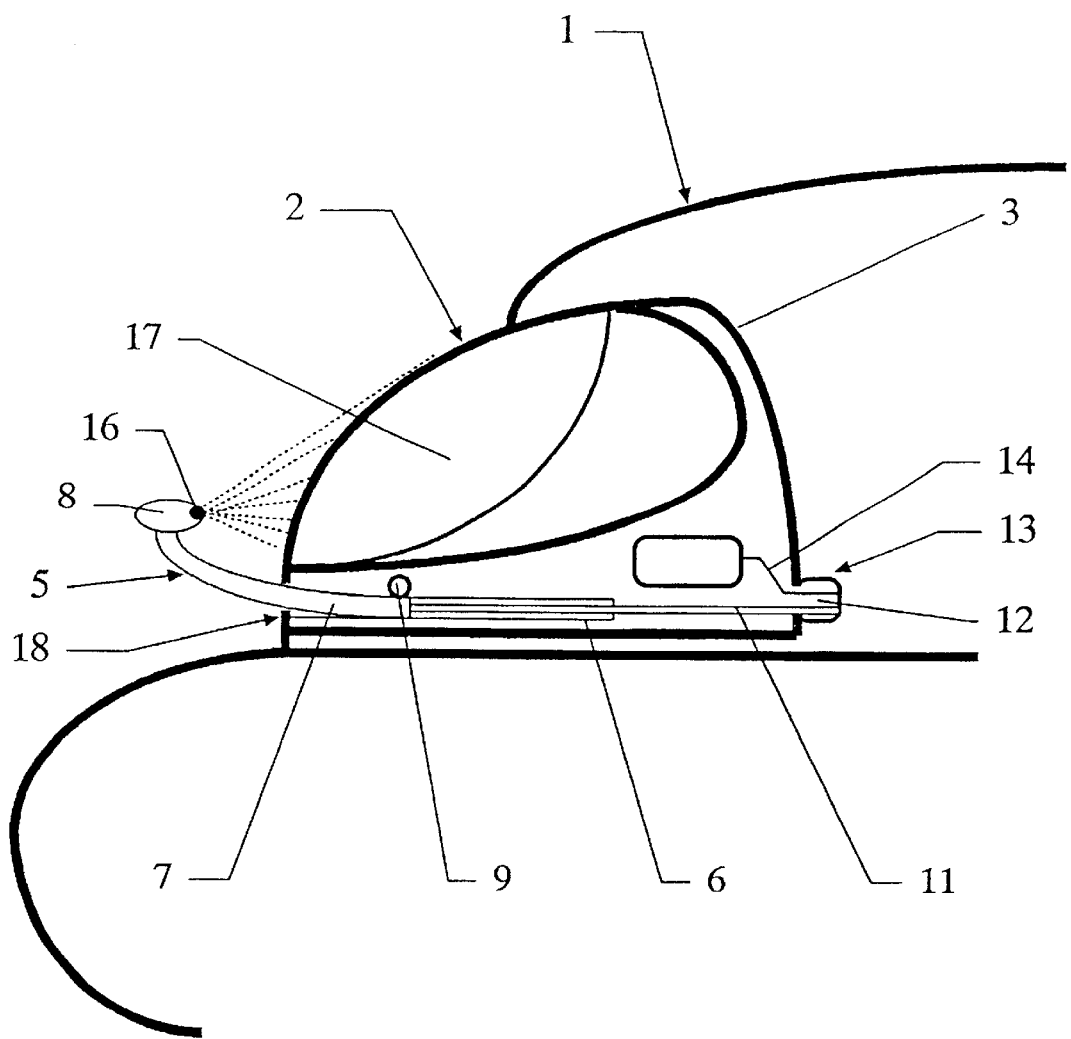

FIG. 1 shows, in a side view, a front section of a body 1, with a headlamp 2 inserted therein in a rest position. The headlamp 2 has a housing 3 which in addition to a reflector 4 also accommodates a headlamp cleaning system 5 arranged below said reflector. The headlamp cleaning system 5 has a supporting arm 7 which can be moved in a guide 6 and is intended for a washer nozzle 8, and a toothed wheel 9 which is driven by a motor (not shown) in order to move the supporting arm 7. The headlamp cleaning system 5 furthermore has a supply pipe 11 for washer fluid, which can be connected to supply units (not shown) by means of a connecting element 13 which is designed as a plug-in connection 12. The connecting element 13 furthermore has an electrical contact 14 for a control unit 15 by means of which the spraying procedure and the positioning movement of the supporting arm 7 are coordinated. In the rest position shown, the washer nozzle 8 is situated in a position which is largely protected from environmental influences and in which an upwardly pointing outlet opening 16 of the washer nozzle 8 is oriented directly below a lens 17 of the headlamp 2. A restricted cleaning action can also be achieved thereby whenever the washer nozzle 8 is moved into an operational position, which is shown in FIG. 2, or whenever in another embodiment the ability to move in this manner is not provided. In an equipment variant, in which the optional headlamp cleaning system 5 is not desired, either a recess 18, which is required for the headlamp cleaning system 5, is closed in the front region of the housing 3 by a cover (not shown) or else an otherwise identical housing 3 without a corresponding recess 18 is used, so that the mounting of the headlamp 2 in the body 1 can be undertaken in an identical manner in both cases.

Figure 3:
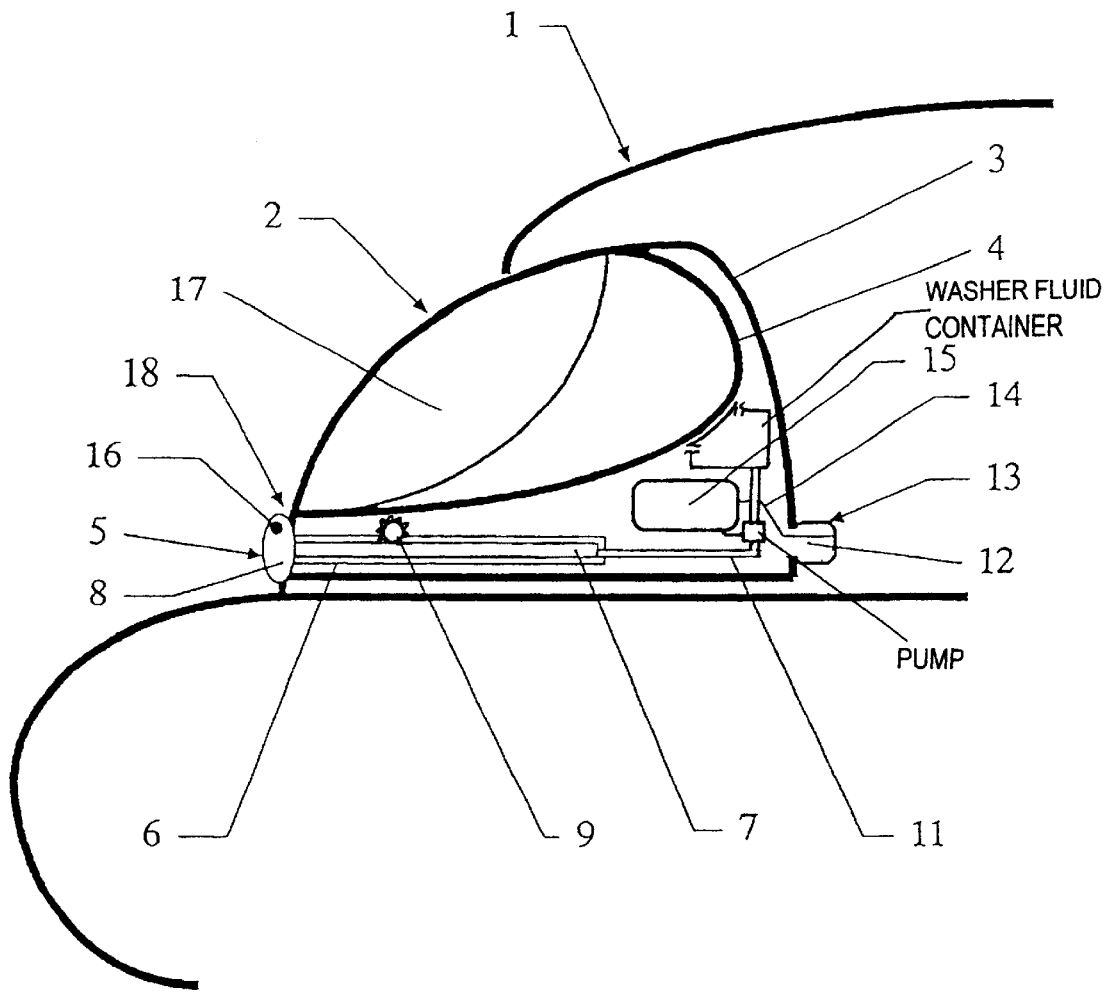
FIG. 3 is the headlamp of FIG. 1 constructed in accordance with a further embodiment of the invention which includes a washer fluid container in the headlamp.

FIG. 2 shows the headlamp cleaning system 5 of the headlamp 2 in an operational position. In this case, the washer nozzle 8 is moved with the outlet opening 16 into a position pivoted in front of the lens 17 of the headlamp 2, so that a substantially improved spraying angle is achieved for the cleaning and the cleaning power is thus considerably improved. For this purpose, the supporting arm 7 is moved forward out of the guide 6 by means of the toothed wheel 9, while at the same time an upwardly directed, flexible deformation occurs, for example by the supporting arm 7, which is pretensioned in the rest position or is deformed by the toothed wheel 9 as it moves out. The supply pipe 11 for the washer fluid, which can be connected together with the electrical contact 14 by means of the connecting element 13, which is designed as a plug-in connection 12, without any problem to a supply unit of the vehicle (not shown), can furthermore be seen. This method of construction therefore makes simple and rapid installation of the headlamp 2 in the body 1 possible, while, for example, clip connections may also be used and therefore make installation without a tool possible. The modular design permits the optional use of the headlamp 2 with the housing 3, which is shown in the drawing and is fitted with the headlamp cleaning system 5, or else with a housing (not shown) without the headlamp cleaning system 5, the recess 18 being omitted or closed. Subsequent retrofitting of the vehicle with a corresponding headlamp cleaning device 5 can also thereby be undertaken without great outlay. For this purpose, washer fluid containers or conveying units may also be accommodated in the housing 3 as shown in FIG. 3.

I claim:

1. A headlamp which is intended for a motor vehicle and has a housing, wherein the housing is formed to accommodate a headlamp cleaning system;

wherein the housing has means including a support arm for moving a washer nozzle of the headlamp cleaning system from a rest position within the housing into an operational position, the support arm being a fluid conduit for the washer nozzle, the housing accomodates a washer fluid container, and a control unit for operation of the cleaning system, wherein a contour of the washer fluid container corresponds to a rear contour of a reflector of the headlamp; and the support arm is prestressed and flexible so as to assume an arcuate attitude for positioning the washer nozzle in front of a lens of the headlamp by a guide upon advancement of the support arm from the rest position to the operational position.

2. The headlamp as claimed in claim 1, wherein the headlamp has a connecting element for an electrical contact.

3. The headlamp as claimed in claim 2, wherein the connecting element is a plug-in connection.

4. The headlamp as claimed in claim 1, wherein a toothed wheel located above the support arm operationally engages the support arm to move said support arm into said operational position.

5. A headlamp which is intended for a motor vehicle and has a housing, wherein the housing is formed to accomodate a headlamp cleaning system;

wherein the housing contains a support arm for moving a washer nozzle of the headlamp cleaning system from a rest position within the housing into an operational position in front of a lens of the headlamp, the support arm being a fluid conduit for the washer nozzle;

the housing accommodates a washer fluid container, and a control unit for operation of the cleaning system, wherein a contour of the washer fluid container corresponds to a rear contour of a reflector of the headlamp; and an element for advancing the support arm so as to assume an arcuate attitude for positioning the washer nozzle in front of the lens of the headlamp upon advancing of the support arm from the rest position to the operational position.

\* \* \* \* \*